United States Patent
Takeuchi

[19]

[11] Patent Number: 6,052,141

[45] Date of Patent: Apr. 18, 2000

[54] IMAGE PROCESSING APPARATUS AND METHOD

[75] Inventor: Akihiko Takeuchi, Susono, Japan

[73] Assignee: Canon Kabushiki Kaisha, Tokyo, Japan

[21] Appl. No.: 08/783,360

[22] Filed: Jan. 16, 1997

[30] Foreign Application Priority Data

Jan. 18, 1996 [JP] Japan ..................................... 8-006583

[51] Int. Cl.[7] .............................. B41J 2/47; G01D 15/14
[52] U.S. Cl. ............................................................. 347/246
[58] Field of Search ..................................... 347/246, 247, 347/236, 237, 238, 253; 358/296, 300, 448, 456

[56] References Cited

U.S. PATENT DOCUMENTS

| | | | |
|---|---|---|---|
| 4,794,413 | 12/1988 | Yamazaki et al. | 347/247 |
| 4,897,734 | 1/1990 | Sato et al. | 358/442 |
| 5,225,850 | 7/1993 | Egawa et al. | 347/246 |

*Primary Examiner*—John Barlow
*Assistant Examiner*—L. Anderson

*Attorney, Agent, or Firm*—Fitzpatrick, Cella, Harper & Scinto

[57] ABSTRACT

An image processing apparatus includes an input unit for inputting an image signal, a conversion unit for converting the image signal input by the input unit into a pulsewidth modulated signal, a driving unit for driving a beam emission device for forming an image in accordance with the pulsewidth modulated signal, a detection unit for detecting an intensity of a beam emitted from the beam emission device, and a setting unit for setting conversion conditions for the conversion unit in accordance with an output from the detection unit. In another aspect, the image processing apparatus includes an input unit for inputting an image signal, a correction unit for correcting the image signal input by the input unit, a driving unit for driving a beam emission device for forming an image in accordance with the corrected image signal, a detection unit for detecting an intensity of a beam emitted from the beam emission device, and a setting unit for setting correction conditions for the correction unit in accordance with an output from the detection unit, wherein the driving unit controls a peak intensity of the beam in accordance with the output from the detection unit.

20 Claims, 8 Drawing Sheets

IMAGE PROCESSING APPARATUS AND METHOD

BACKGROUND OF THE INVENTION

The present invention relates to an image processing apparatus and method which forms an image by emitting a laser beam in accordance with image signals and, more particularly, to processing which stabilizes the quantity of light emitted by the laser beam.

There are image forming apparatuses adopting a variety of printing methods, such as electrophotographic, ink-jet, thermosensible-transfer and wire dot, which form an image in accordance with image signals sent from a host computer.

Among the above methods, presently, the electrophotographic printing method has been widely used because of its features of high-speed operation, high quality image reproduction and quiet operation. Particularly, since it is possible for an image forming apparatus using a laser beam exposure method to expose, for a period of time less than that corresponding to one dot width, by modulating the duration of a laser beam, it is possible to easily express tones by using multi-valued data for each dot. This is an advantageous feature of the electrophotographic printing method compared to the other printing methods mentioned above. This feature has become more important as color image formation is more frequently performed.

In order to form a multi-valued image, a modulator for dividing a laser beam pulsewidth into a time period corresponding to less than one dot and a formatter for converting digital image data into a laser driving signal are required.

Figure 1A:
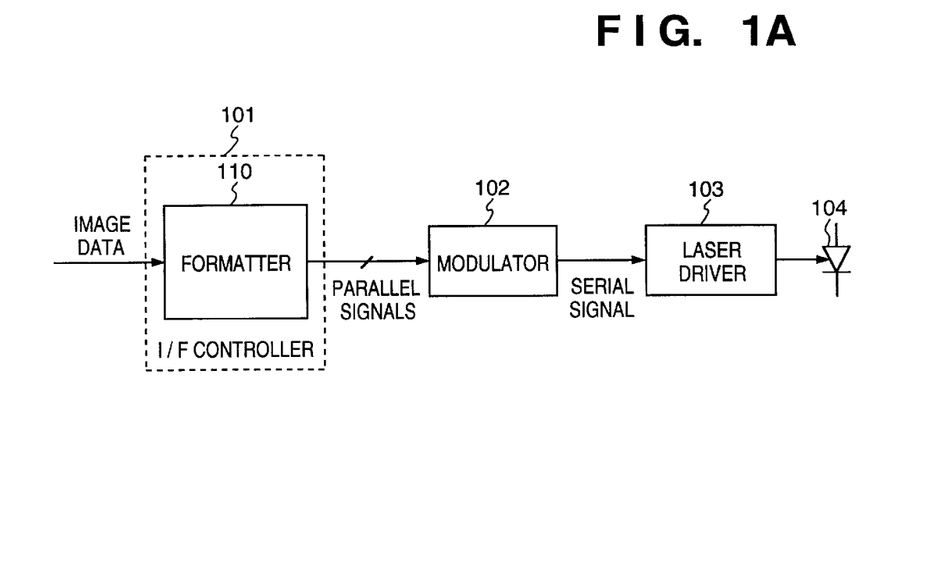
FIGS. 1A and 1B are block diagrams illustrating configurations of a printer controller.
Figure 1B:
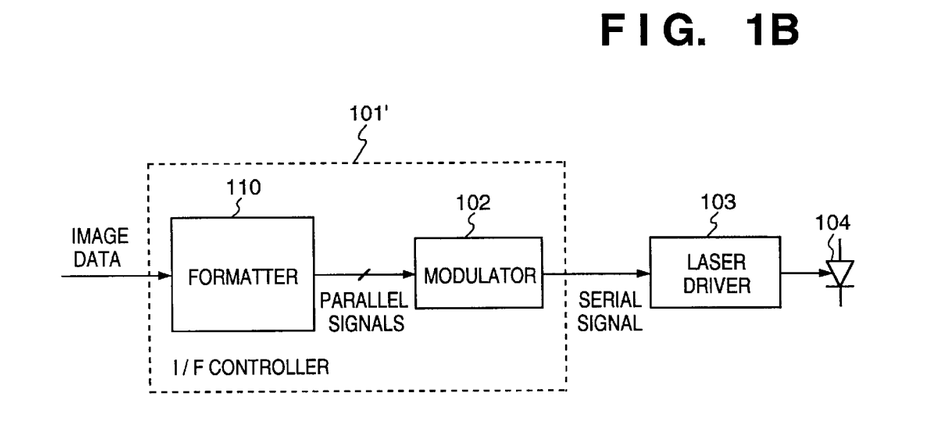

FIGS. 1A and 1B are block diagrams illustrating examples of configurations of a printer controller.

There are two ways of setting a modulator 102. In one configuration, the modulator 102 is provided upstream from a laser driver 103 as shown in FIG. 1A, and in the other configuration, the modulator 102 is provided inside of an interface controller 101' as shown in FIG. 1B. In either case, the modulator 102 converts digital image signals (parallel signals of generally 4 to 8 bits) outputted from a formatter 110 into a serial signal, and inputs the serial signal into the laser driver 103 which drives a semiconductor laser diode (LD) 104.

Image data is inputted to the interface controllers 101 and 101' from various kinds of host computers. Therefore, the interface controller and the formatter must be able to properly process input data from various kinds of host computers. Accordingly, the formatter 110 has to be designed in conformance with the type of image data inputted from a host computer.

Therefore, in order to interface a printer engine to a variety of host computers, it is common to manufacture a printer engine which is partially completed, then at a later time attach the interface controller 101 or 101' to conform to the host computer.

Further, there is a demand to increase the degree of freedom of the interface controllers 101 and 101'in forming an image, to the extent possible. For example, the interface controller 101', shown in FIG. 1B, which generates digital image signals as well as a serial signal for driving the LD 104, is superior to the interface controller 101 shown in FIG. 1A, which does not generate a serial signal.

The degree of freedom of a controller in forming an image is called "the degree of freedom for designing". More specifically, the interface controller 101 in the configuration shown in FIG. 1A can deal with tone data represented by digital signal values only. By contrast, the interface controller 101' in the configuration shown in FIG. 1B can convert digital signals (parallel signals) into an analog signal by using the modulator 102. Accordingly, the interface controller 101' can completely control how long the laser beam is to be emitted (emission time). This is known as a "high degree of freedom for designing".

However, there is a problem in outputting a half-tone image in a stable state in the configuration shown in FIG. 1B. The laser beam pulsewidth varies since there are variations in pulsewidth of a modulated signal (serial signal) for driving the LD 104 and, even though a signal of a fixed pulsewidth is inputted to the laser driver 103, since the driving threshold and current-output light (I-L) characteristics of a laser diode used as the LD 104 in the configuration shown in FIG. 1B varies one from another. For example, in order to print an image in a resolution of 600 dpi, which is a typical resolution, by a laser beam printer, a laser beam pulse whose width is about 40 ns per pixel has to be divided into a plurality of laser beam pulses, while the deviation in pulsewidth is a few nano-seconds.

In the configuration shown in FIG. 1A, the relationship between the multi-valued digital image data and the laser beam pulsewidth can be adjusted for each printer engine in advance. However, it is time consuming and costly to adjust the relationship for each printer engine to print a half-tone image faithfully and in stable state in accordance with image data outputted from the formatter 110.

Further, the following problems are posed in the aforesaid techniques.

Namely, although an interface controller for a laser beam printer having the configuration shown in FIG. 1B is advantageous with respect to the degree of freedom attained in image formation, it is rarely used because of the aforesaid reason, and if it were used, the half-tone output would not be stable.

In order to compensate for the aforesaid defect, there is a method of forming test patches on an electrostatic drum, measuring their densities, and correcting image data on the basis of the measured densities. However, since the measured density values in this correcting method include variations due to such factors as the developing unit and the electrostatic drum, the laser beam pulsewidth is not properly corrected. In practice, in a case where the density decreases are due to deterioration of the developing unit, if every laser beam pulsewidth were made longer, it would not be possible to obtain the maximum density. Moreover, the tone of the output image would be abnormal.

Even if characteristics of a developing unit and an electrostatic drum are corrected by adjusting developing bias and charged potential in accordance with the measured densities of the test patches, there are nonetheless large variations in laser beam pulsewidths. Accordingly there is a dilemma in that neither of the half-tone test patches can be a reference for making corrective adjustments.

SUMMARY OF THE INVENTION

The present invention has been made in consideration of the aforesaid situation, and has as its object to provide an image processing apparatus and method capable of stabilizing the quantity of light of a laser beam which is advantageously used in forming an image and emitted in accordance with image data.

According to the present invention, the foregoing object is attained by providing an image processing apparatus comprising: input means for inputting an image signal;

conversion means for converting the image signal input by the input means into a pulsewidth modulated signal; driving means for driving a beam emission device for forming an image in accordance with the pulsewidth modulated signal; detection means for detecting an intensity of a beam emitted from the beam emission device; and setting means for setting conversion conditions for the conversion means in accordance with an output from the detection means.

Further, the foregoing object is also attained by providing an image processing apparatus comprising: input means for inputting an image signal; correction means for correcting the image signal input by the input means; driving means for driving a beam emission device for forming an image in accordance with the corrected image signal; detection means for detecting an intensity of a beam emitted from the beam emission device; and setting means for setting correction conditions for the correction means in accordance with an output from the detection means, wherein the driving means controls a peak intensity of the beam in accordance with the output from the detection means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

<First Embodiment>

[Structure]

Figure 2:
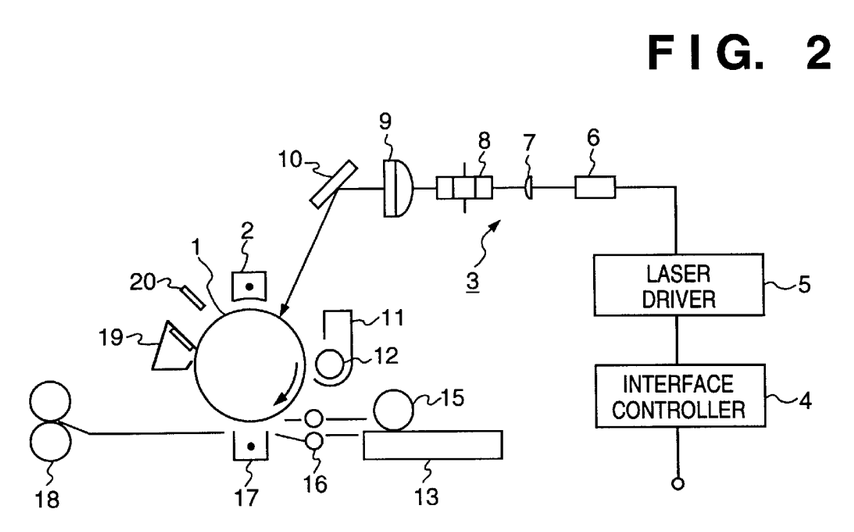
FIG. 2 is a diagram showing a configuration of an image forming apparatus according to a first embodiment of the present invention.

FIG. 2 is a block diagram illustrating a configuration of an image forming apparatus according to an embodiment of the present invention.

In FIG. 2, an electrostatic drum 1 has a substrate having a layer whose potential changes upon incidence of light. This layer is charged to a predetermined potential by a primary charger 2. Thereafter, a beam emitted from an exposure unit 3 in correspondence with image information is transmitted to the electrostatic drum 1 which is uniformly charged, thereby forming a latent image. The exposure unit 3 comprises an interface controller 4, a laser driver 5, a semiconductor laser diode (LD) 6, a collimator 7, a polygon mirror 8, a F.θ lens 9 and a mirror 10.

Further, a developing unit 11 has a developing roller 12 which rotates while being provided with a developer. A developing bias potential is applied to the developing roller 12. The electric field due to the potential difference between the developing bias potential and the charged potential of the electrostatic drum 1 causes the developer to be transferred to the latent image formed on the electrostatic drum 1, thereby converting the latent image into a visible toner image.

Meanwhile, recording paper sheets provided in a paper-feed tray 13 are picked up one by one by a paper-feed roller 15 and conveyed at the proper timing by a resist roller 16 to a transfer unit, which comprises a transfer charger 17 and the electrostatic drum 1. The transfer charger 17 transfers a toner image formed on the electrostatic drum 1 to a recording paper sheet. Then, the recording paper sheet onto which the toner image is transferred is sent to a fixing unit 18 where the toner image is fixed. Then the sheet is discharged from the apparatus.

After the toner image is transferred to the paper sheet, soil, such as residual toner, on the surface of the electrostatic drum 1 is removed by a cleaner 19 in order to prepare for the next image formation. Further, residual charge is removed from the electrostatic drum 1 by uniformly exposing the surface of the electrostatic drum 1 using an LED array 20.

[Operation]

Next, an example of the operation of the image formation apparatus configured as above will be explained. An image signal representing image information sent from a host computer (not shown), or the like, is inputted to the interface controller 4 and processed there. The laser driver 5 directs the LD 6 to emit a beam in accordance with the output from the interface controller 4.

A laser beam outputted from the LD 6 is converged by the collimator 7, reflected by the rotating polygon mirror 8, passed through the F.θ lens 9, an optical system (not shown) which corrects for surface variations of the polygon mirror 8, and the mirror 10, and then is transmitted to the electrostatic drum 1. It should be noted that the polygon mirror 8 reflects the laser beam so as to scan the surface of the electrostatic drum 1 in the direction perpendicular to the rotating direction.

The charge of the electrostatic drum (which was uniformly charged by the primary charger 2) decreases at an area, exposed to by the laser beam. The charge is preserved at the remaining area which is not exposed. Accordingly, a latent image is formed in accordance with the ON/OFF of the LD 6.

Then, the latent image is visualized by the developing unit 11 and a toner image is obtained. This toner image is transferred to a recording paper sheet by a transfer charger 17, then fixed at the fixing unit 18.

Figure 3:
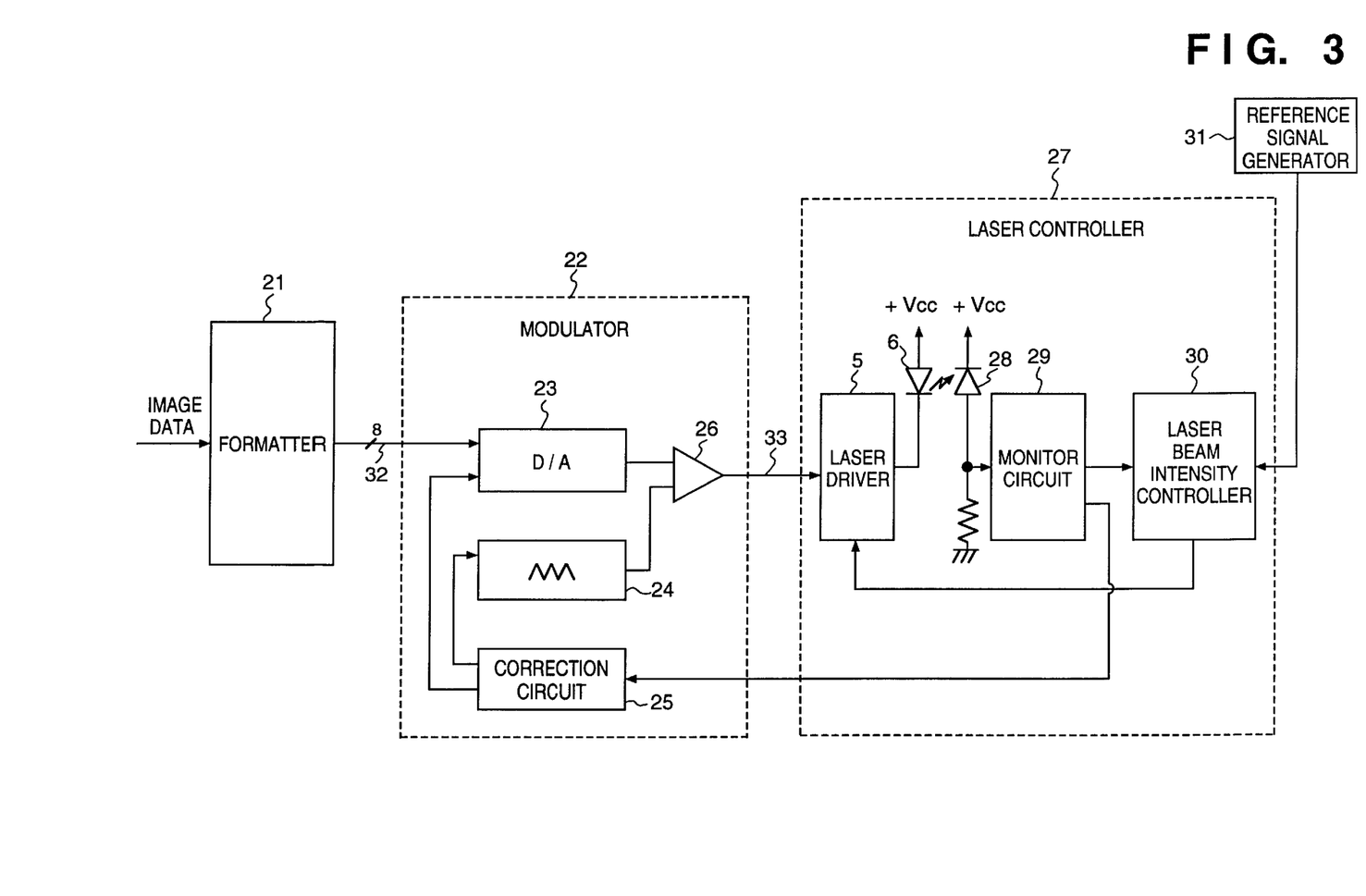
FIG. 3 is a block diagram illustrating a configuration of a printer controller according to the first embodiment.

FIG. 3 is a block diagram illustrating a configuration of a printer controller according to the first embodiment.

In FIG. 3, a formatter 21 converts various kinds of image data inputted from a host computer into eight-bit digital image data 32 representing, for example, image density (i.e., 256 tones), applies image processes (e.g., γ correction) in accordance with density reproduction characteristics of a printer engine, and then outputs the image data to a modulator 22.

The modulator 22 comprises a D/A converter 23, a triangular wave generator 24, a comparator 26, and a correction circuit 25. The modulator 22 controls a period of ON time for the LD 6 that is sufficiently shorter than the period of time corresponding to one dot width, by converting the eight-bit image data into pulsewidth signals for driving the LD 6. The detailed function of the modulator 22 will be explained later. By way of example, assuming that the resolution of the printer engine is 600 dpi and the printing speed (speed of a paper carriage) is 100 mm/s, the ON time period for one dot in the width of a shorter side of an A4 paper sheet (210 mm) is calculated as follows:

$$600 \times 210/25.4 \approx 4960 \text{ dot/line}$$

$$4960 \times 600 \times 100/25.4 \approx 11.7 \times 10^6 \text{ dot/sec}$$

$$1/11.7 \times 10^3 \approx 85 \text{ ns/dot}$$

Accordingly, the ON time period per one dot is about 85 ns. However, the scanning width of the laser beam is 1.5 to 2 times wider than the shorter side of an A4 paper sheet. Therefore, taking this into consideration, the ON time period per dot is about 40 ns for printing a binary image. When printing an eight-bit multi-valued image, for example, the ON time period is further divided by 256.

A modulated signal 33 outputted from the modulator 22 enters the laser driver 5 in a laser controller 27, and the LD 6 is driven on the basis of the modulated signal 33. In the periphery of the LD 6, a PIN photodiode 28 is provided and the intensity of the laser beam can be monitored by a monitoring circuit 29. An output from the monitoring circuit 29 enters a laser beam intensity controller 30 where it is compared with a signal level of a reference signal from a reference signal generator 31. A deviation signal is fed back to the laser driver 5. The laser driver 5 controls the output current, i.e., the driving current for driving the LD 6, in accordance with the deviation signal. Namely, the output from the monitoring circuit 29, i.e., the peak intensity of a laser beam from the LD 6, is stabilized by this feed-back loop.

Note, the aforesaid control for the intensity of a laser beam is normally performed when not forming an image, by turning the LD 6 ON continuously. While the LD 6 is ON continuously, the quantity of light E per dot is controlled so as to illuminate the electrostatic drum 1 with a predetermined quantity, E0, per dot.

When uniform half-tone image data DH is inputted to the modulator 22, for example, the modulated signal 33 becomes repeating pulses having the pulsewidth TH. When this pulse signal is inputted to the laser driver 5, the LD 6 repeatedly emits a beam for a period of time substantially corresponding to the pulsewidth TH.

Figure 4:
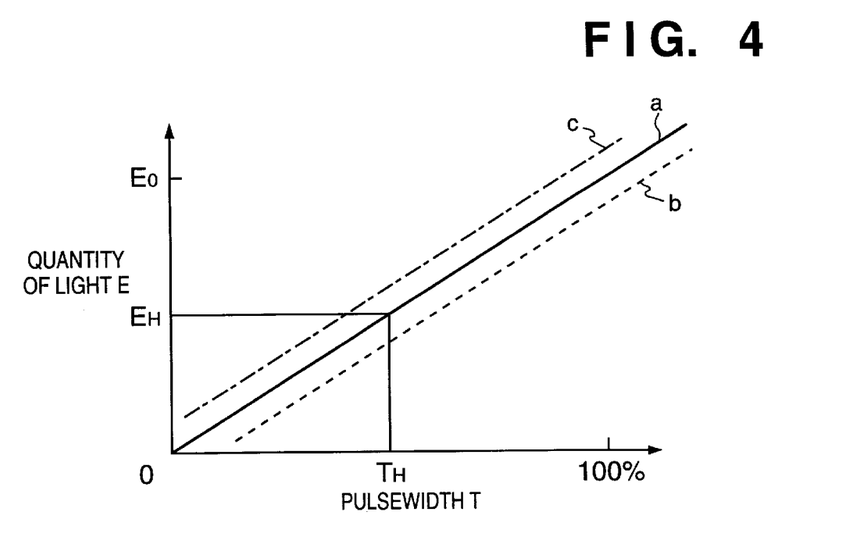
FIG. 4 is a graph showing a relationship between pulsewidths T of modulation signals and quantities of light E.
Figure 5:
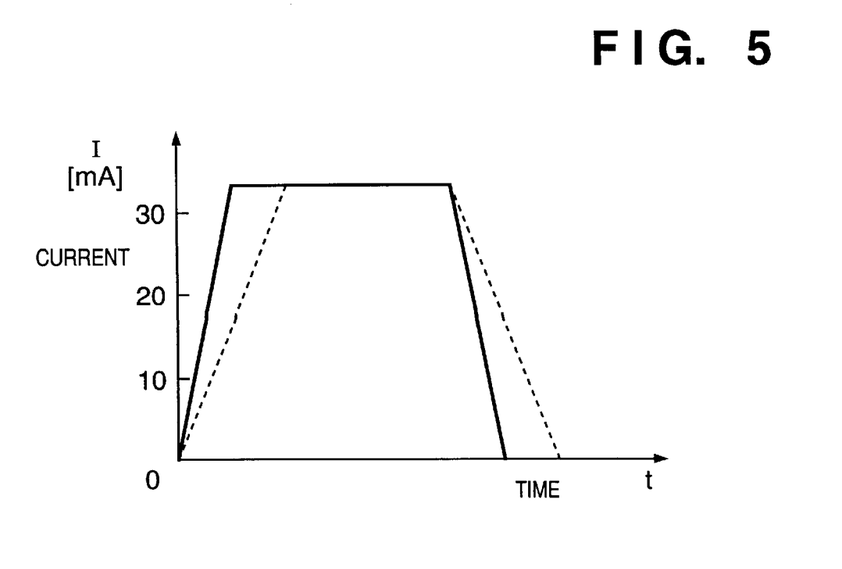
FIG. 5 is a graph showing characteristics of leading and trailing edges of an output current flowing in a laser driver shown in FIG. 3.
Figure 6:
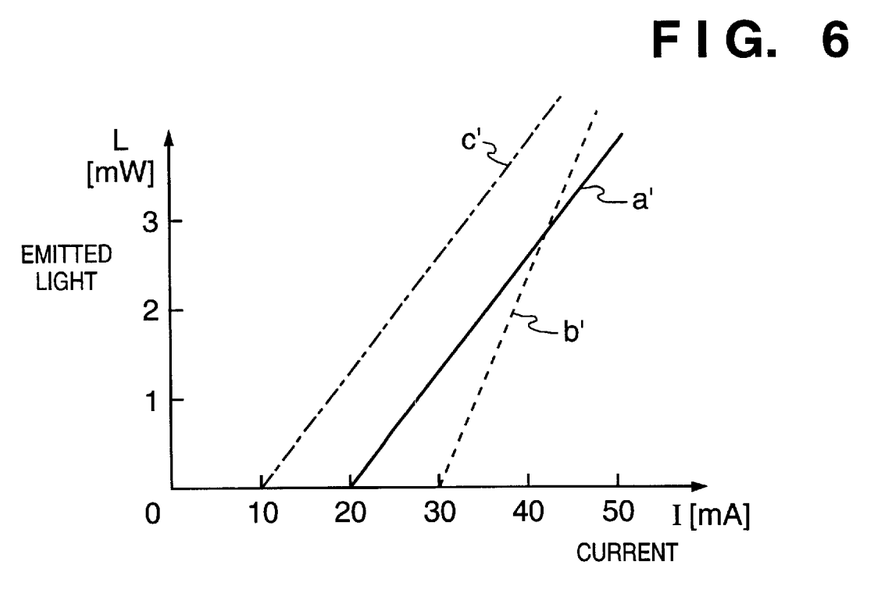
FIG. 6 is a graph showing current-output light characteristics of a semiconductor laser diode shown in FIG. 3.

FIG. 4 is a graph showing a relationship between the pulsewidths T of the modulated signal 33 and quantities of light E which can be obtained by integrating outputs from the monitoring circuit 29 (i.e., integrated value of a laser beam pulse intensity) (T-E characteristics). The variations in the T-E characteristics, referred to by reference numerals a to c, are caused by variations in leading and trailing edges of an output current from the laser driver 5, as shown in FIG. 5, and variations in threshold and slope showing current to output light (I-L) characteristics of a laser diode to be used as the LD 6, as shown in FIG. 6. These factors cause variations in pulsewidths of a laser beam on the order of a few ns regardless of the laser beam intensity control, which results in variations in T-E characteristics. The above factors are not the only reasons for variations in pulsewidths of a laser beam. Variations in the pulsewidths are also caused when image data DH is converted into pulses having pulsewidths TH.

Figure 7:
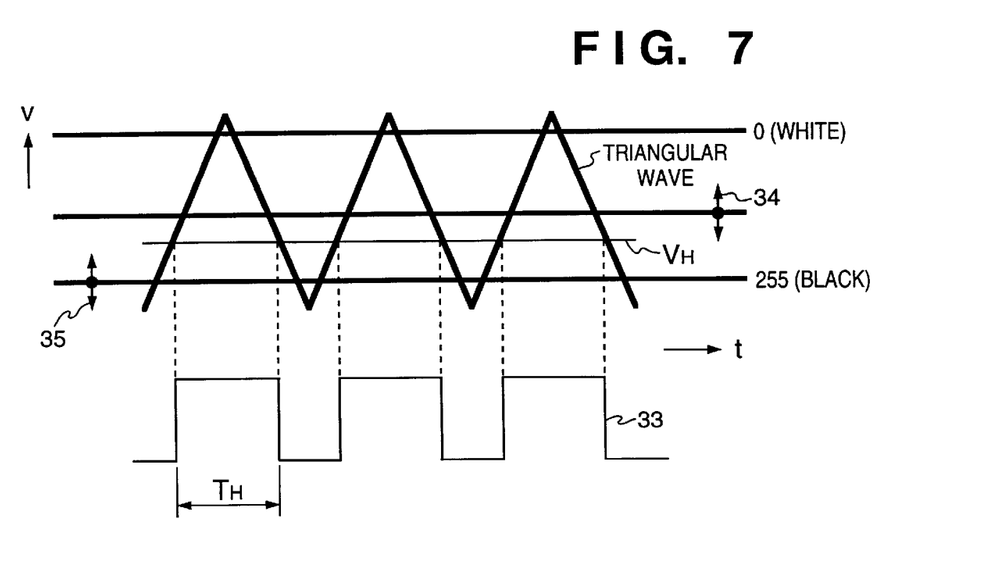
FIG. 7 is a diagram for explaining a method for generating a modulated signal 33 shown in FIG. 3.

Meanwhile, the image data DH is converted into an analog signal of voltage level VH by the D/A converter 23. This analog signal is compared to a triangular wave signal generated by the triangular wave generator 24 by the comparator 26, and the modulated signal 33 having a pulsewidth of TH is generated. More specifically, the relationship between the pulsewidth TH and the image data DH can be arbitrarily set by adjusting an offset voltage 34 of the triangular wave and a gain 35 of the D/A converter 23.

Figure 8:
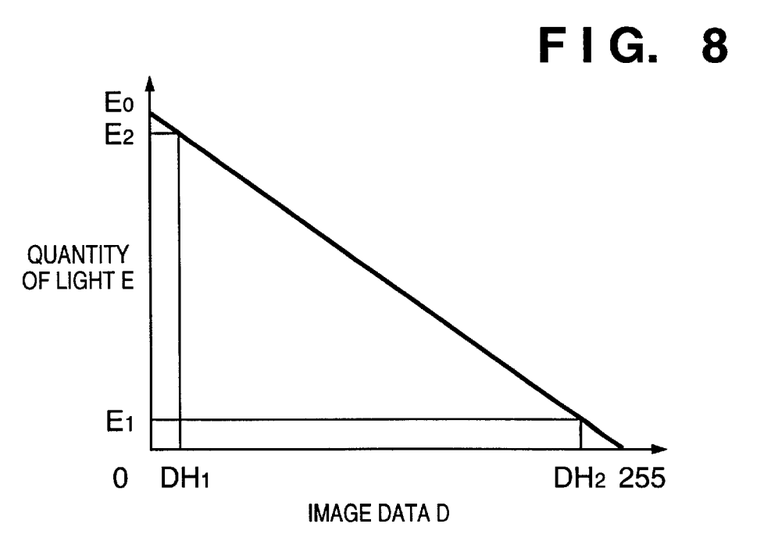
FIG. 8 is a graph for explaining how the quantity of light is controlled.

Therefore, by controlling the offset voltage 34 and the gain 35 so that the quantity of light E obtained by integrating the output from the monitoring circuit 29 becomes a predetermined value E1 for image data DH1 having a predetermined signal level and, a predetermined value E2 for image data DH2 having another predetermined signal level, it is possible to control the relationship between the image data DH and the quantity of light E to a desired relationship (this operation is called "quantity control", hereinafter) (refer to FIG. 8). The correction circuit 25 controls the offset voltage 34 and the gain 35. The correction circuit 25 may be configured with a known integrator and level controller which is called an electronic volume. It should be noted that the image data DH1 and DH2 (DH1<DH2) is stored in a ROM of a one-chip CPU (not shown) of the interface controller 4, for example, and enters the modulator 22 as the image data 32 at predetermined timing, such as at predetermined intervals, when starting printing, or when starting each page of printing. Then, the quantity control is performed. Further, in order to obtain a wider linear relationship region in T-E characteristics, the quantity of light E2 emitted during the pulsewidth TH1 of a driving signal corresponding to near 0 value of image data is set to the minimum value, and the quantity of light E1 emitted during the pulsewidth TH2 corresponding to near FF value of image data is set to the maximum value. The pulsewidth TH2 obtained from the image signal DH2 has to be longer than the total period of time between the leading and trailing edges, shown in FIG. 5, of the output current from the laser driver 5.

As described above, it is possible to correct the variations in the leading and trailing edges of an output current from the laser driver 5, the variations in threshold and slope in the I-L characteristics of the LD 6, the variations due to a conversion process from the image data DH into the pulsewidth TH, and so on, in the quantity control by controlling the gain 35 of the D/A converter 23 and the offset voltage 34 of the triangular wave in accordance with the quantity of light E obtained by integrating the output from the monitoring circuit 29, which monitors the intensity of light from LD 6. Thus a stable quantity of light E, i.e., a laser beam which is emitted during the pulsewidth TH in accordance with the image data DH, is obtained.

In other words, the printer controller which performs the quantity control has the following advantages.

(1) If the modulator 22 is provided in the printer engine as shown in FIG. 1A, it is possible to provide an inexpensive printer engine capable of printing a stable half-tone image faithfully which requires no adjustment to the relationship between multi-valued digital image data and pulsewidths of a laser beam for each printer engine.

(2) If the modulator 22 is provided in the interface controller 4 as shown in FIG. 1B, it is possible to print a stable half-tone image faithfully, since it is possible to automatically control the relationship between multi-valued digital image data and pulsewidths of a laser beam by controlling the quantity of light corresponding to image data to a predetermined value.

According to the first embodiment as described above, it is possible to print a stable half-tone image faithfully by using a printer controller shown in either FIG. 1A or 1B.

Furthermore, when correcting the characteristics of a developing unit and an electrostatic drum by controlling a developing bias and a changed potential of the electrostatic drum in accordance with the measurement results of test patch densities, since it is possible to correctly form half-tone test patches to be referred by compensating variations in pulsewidths of a laser beam, it is possible to accurately control the developing bias and the charged potential.

<Second Embodiment>

An image processing apparatus according to a second embodiment of the present invention will be described below. In the second embodiment, the same units and elements as those described in the first embodiment (refer to FIG. 3) are referred by the same reference numerals, and explanations of those are omitted.

In the above first embodiment, a method which performs the quantity control by controlling the relationship between the image data 32 and the modulated data 33 by using the correction circuit 25 provided in the modulator 22 has been explained. In the second embodiment, a method which performs the quantity control by correcting the image data 32 is used.

Figure 9:
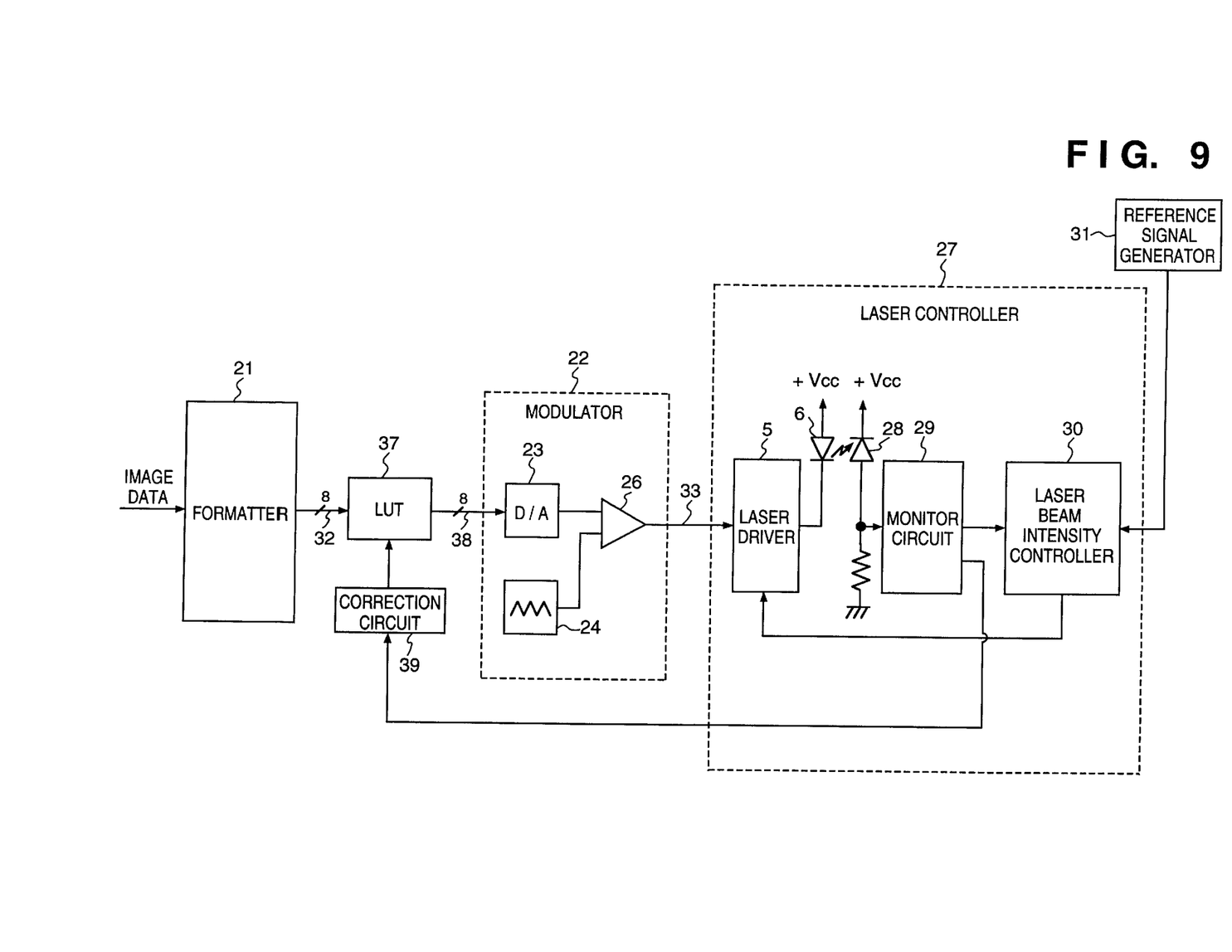
FIG. 9 is a block diagram illustrating a configuration of a printer controller according to a second embodiment of the present invention.

FIG. 9 is a block diagram illustrating a configuration of a printer controller according to the second embodiment. A look-up table (LUT) 37 comprising a RAM is provided upstream from the modulator 22 as means for correcting the image data 32, and data of the LUT 37 is rewritten in accordance with the obtained quantity of light. Initial data for the LUT 37 is stored in a ROM of a one-chip CPU (not shown) of the interface controller 4, and set to the LUT 37 at the initialization of the interface controller 4. This initial data is set based on a desired relationship between the image data 32 and the quantity of light E obtained in advance.

After the quantity control starts, the image data DH1 and DH2 are outputted as the image data 32, as described above, and converted into image data 38 by the LUT 37. The image data 38 is inputted to the modulator 22 and then to the laser driver 5, and causes the LD 6 emit a beam. The intensity of the emitted beam from the LD 6 is detected by the monitoring circuit 29, and the output of the monitoring circuit 29 is sent to a correction circuit 39. The correction circuit 39 integrates the output from the monitoring circuit 29 and obtains the quantities of light E1 and E2, and rewrites the data of the LUT 37 on the basis of the obtained quantities of light E1 and E2 so that the T-E characteristics have a linear relationship. It is also possible for the CPU of the interface controller 4 to set appropriate data to the LUT 37 in accordance with the quantities of light E1 and E2 obtained in the correction circuit 39. In this case, the CPU can select the optimal data table from a plurality of data tables prepared in advance.

Note, the LUT 37 can also include a conversion unit for image processing (e.g., $\gamma$ correction) corresponding to the density reproduction characteristics of a printer engine.

<Other Embodiment>

In the aforesaid embodiments, a method which performs the quantity control by referring to the quantity of light EH obtained by integrating the output from the monitoring circuit 29 is described. However, the present invention is not limited to this, and it is possible to further increase control precision by storing a measured value E0 of a quantity of light when the laser is continuously kept ON and controlling the modulator 22 and rewriting the LUT 37 by using a ratio $\alpha = EH/E0$, where EH is obtained in a later process.

Further, in the aforesaid embodiments, an example of applying the present invention to an image forming apparatus, such as a laser beam printer which forms a monochromatic image, is explained. However, the present invention is not limited to this, and if the present invention is applied to an image forming apparatus which forms a color image, it is possible to reproduce colors which are faithful to input image data, thereby outputting a high-quality full-color image.

The present invention can be applied to a system constituted by a plurality of devices (e.g., host computer, interface, reader, printer) or to an apparatus comprising a single device (e.g., copying machine, facsimile).

Further, the object of the present invention also can be achieved by providing a storage medium storing program codes for performing the aforesaid processes to a system or an apparatus, reading the program codes from the storage medium with a computer (e.g., CPU, MPU) of the system or apparatus, and then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, the present invention includes a case where an OS (operating system) or the like working on the computer performs partial or entire processes in accordance with designations of the program codes and thereby realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a partial or entire process in accordance with designations of the program codes and thereby realizes functions of the above embodiments.

In other words, the foregoing description of embodiments has been given for illustrative purposes only and is not to be construed as imposing any limitation in any respect.

The scope of the invention is, therefore, to be determined by the following claims and their equivalents and not be limited by the text of the specification and embodiments described therein. Alterations made within a scope equivalent to the scope of the claims fall within the true spirit and scope of the invention.

What is claimed is:

1. An image processing apparatus comprising:
   input means for inputting an image signal;
   conversion means for converting the image signal input by said input means into a pulsewidth modulated signal;
   driving means for driving a beam emission device for forming an image in accordance with the pulsewidth modulated signal;

detection means for detecting an intensity of a beam emitted from the beam emission device; and setting means for setting conversion conditions for said conversion means in accordance with a quantity of light calculated from an output from said detection means, wherein said driving means controls a peak intensity of the beam in accordance with the output from said detection means.

2. The image processing apparatus according to claim 1, wherein said conversion means generates the pulsewidth modulated signal by comparing the image signal to a pattern signal having a predetermined period.

3. The image processing apparatus according to claim 2, wherein said setting means sets a level difference between the image signal and the pattern signal.

4. The image processing apparatus according to claim 1, wherein said setting means integrates a signal, which indicates the intensity of the beam, output from said detection means to calculated the quantity of light, and sets the conversion conditions for said conversion means in accordance with the calculated quantity of light.

5. The image processing apparatus according to claim 4, wherein said setting means sets the conversion conditions so that a relationship between the image signal input to said conversion means and the the quantity of light of the beam is substantially stable.

6. An image processing apparatus comprising:
input means for inputting an image signal;
correction means for correcting the image signal input by said input means;
driving means for driving a beam emission device for forming an image in accordance with the corrected image signal;
detection means for detecting an intensity of a beam emitted from the beam emission device; and
setting means for setting correction conditions for said correction means in accordance with a quantity of light calculated from an output from said detection means,
wherein said driving means controls a peak intensity of the beam in accordance with the output from said detection means.

7. The image processing apparatus according to claim 6, wherein said driving means includes generation means for generating a pulsewidth modulated signal on the basis of the image signal corrected by said correction means in accordance with a pattern signal having a predetermined period, and drives the beam emission device on the basis of the pulsewidth modulated signal.

8. The image processing apparatus according to claim 7, wherein said setting means integrates a signal, which indicates the intensity of the beam, output from said detection means to calculate the quantity of light, and sets the conversion conditions for said conversion means in accordance with the calculated quantity of light.

9. The image processing apparatus according to claim 8, wherein said setting means sets the conversion conditions so that a relationship between the image signal input to said conversion means and the quantity of light of the beam is substantially stable.

10. The image processing apparatus according to claim 6, wherein the correction conditions are data of a correction table for said correction means.

11. An image processing method comprising the steps of:
inputting an image signal;
converting the image signal, input in said inputting step, into a pulsewidth modulated signal;
driving a beam emission device for forming an image in accordance with the pulsewidth modulated signal:
detecting an intensity of a beam emitted from the beam emission device; and
setting conversion conditions for said conversion step in accordance with a quantity of light calculated from a detection result in said detecting step,
wherein said driving step includes controlling a peak intensity of the beam in accordance with the detection result in said detecting step.

12. An image processing method comprising the steps of:
inputting an image signal;
correcting the image signal input in said inputting step;
driving a beam emission device for forming an image in accordance with the corrected image signal;
detecting an intensity of a beam emitted from the beam emission device; and
setting correction conditions for said correction step in accordance with a quantity of light calculated from a detection result in said detecting step,
wherein said driving step includes controlling a peak intensity of the beam in accordance with the detection result.

13. A printer which is mounted to an image processing apparatus, said apparatus comprising:
input means for inputting an image signal;
conversion means for converting the image signal input by said input means into a pulsewidth modulated signal;
driving means for driving a beam emission device for forming an image in accordance with the pulsewidth modulated signal;
detection means for detecting an intensity of a beam emitted from the beam emitting device; and
setting means for setting conversion conditions for said conversion means in accordance with a quantity of light calculated from an output from said detection means,
wherein said driving means controls a peak intensity of the beam in accordance with an output from said detection means.

14. A printer which is mounted to an image processing apparatus, said apparatus comprising:
input means for inputting an image signal;
correction means for correcting the image signal input by said input means;
driving means for driving a beam emission device for forming an image in accordance with the corrected image signal;
detection means for detecting an intensity of a beam emitted from the beam emission device; and
setting means for setting correction conditions for said correction means in accordance with a quantity of light calculated from an output from said detection means,
wherein said driving means controls a peak intensity of the beam in accordance with the output from said detection means.

15. An image processing apparatus, said apparatus comprising:
input means for inputting an image signal,
conversion means for converting the image signal input by said input means into a pulsewidth modulated signal;
driving means for driving a beam emission device for forming an image in accordance with the pulsewidth modulated signal;

detection means for detecting an intensity of a beam emitted from the beam emission device; and setting means for setting conversion conditions for said conversion means in accordance with a quantity of light calculated from an output from said detection means.

16. A printer which is mounted to an image processing apparatus, said apparatus comprising:

input means for inputting an image signal;

conversion means for converting the image signal input by said input means into a pulsewidth modulated signal;

driving means for driving a beam emission device for forming an image in accordance with the pulsewidth modulated signal;

detection means for detecting an intensity of a beam emitted from the beam emission device; and setting means for setting conversion conditions for said conversion means in accordance with a quantity of light calculated from an output from said detection means.

17. An image processing apparatus, said apparatus comprising:

input means for inputting an image signal;

correction means for correcting the image signal inputted by said input means;

driving means for driving a beam emission device for forming an image in accordance with the corrected image signal;

detection means for detecting an intensity of a beam emitted from the beam emission device; and setting means for setting correction conditions for said correction means in accordance with a quantity of light calculated from an output from said detection means.

18. A printer which is mounted to an image processing apparatus, said apparatus comprising:

input means for inputting an image signal;

correction means for correcting the image signal input by said input means;

driving means for driving a beam emission device for forming an image in accordance with the corrected image signal;

detection means for detecting an intensity of a beam emitted from the beam emission device; and setting means for setting correction conditions for said correction means in accordance with a quantity of light calculated from an output from said detection means.

19. An image processing method comprising the steps of:

inputting an image signal;

converting the image signal, input in said inputting step, into a pulsewidth modulated signal;

driving a beam emission device for forming an image in accordance with the pulsewidth modulated signal;

detecting an intensity of a beam emitted from the beam emission device; and setting conversion conditions for said conversion step in accordance with a quantity of light calculated from a detection result in said detecting step.

20. An image processing method comprising the steps of:

inputting an image signal;

correcting the image signal input in said inputting step;

driving a beam emission device for forming an image in accordance with the corrected image signal;

detecting an intensity of a beam emitted from the beam emission device; and setting correction conditions for said correcting step in accordance with a quantity of light calculated from a detection result in said detection step.

* * * * *

UNITED STATES PATENT AND TRADEMARK OFFICE
CERTIFICATE OF CORRECTION

PATENT NO.   : 6,052,141
DATED        : April 18, 2000
INVENTOR(S)  : Akihiko Takeuchi Page 1 of 1

It is certified that error appears in the above-identified patent and that said Letters Patent is hereby corrected as shown below:

<u>Title page,</u>
Foreign Application Priority Data [30], "8-006583" should read -- 8-006563 --.

Reference Cited [56], U.S. PATENT DOCUMENTS, insert the following:
-- 4,709,250   11/1987   Takeuchi       346/160 --;
-- 4,814,791   03/1989   Ohara, et al.  347/246 --;
-- 4,864,419   09/1989   Saito, et al.  358/300 --; and
-- 5,043,745   08/1991   Inoue, et al.  347/246--.

<u>Column 4,</u>
Line 55, "area," should read -- area --.

<u>Column 7,</u>
Line 47, "emit" should read -- to emit --.

<u>Column 10,</u>
Line 2, "signal:" should read -- signal; --.
Line 60, "signal," should read -- signal; --.

Signed and Sealed this

Eleventh Day of September, 2001

Attest:

*Nicholas P. Godici*

NICHOLAS P. GODICI
*Attesting Officer*   *Acting Director of the United States Patent and Trademark Office*